United States Patent
Howland et al.

(10) Patent No.: US 8,534,178 B2
(45) Date of Patent: Sep. 17, 2013

(54) SOFT PLATE SOFT PANEL BONDED MULTI LAYER ARMOR MATERIALS

(75) Inventors: Charles A Howland, Temple, NH (US); Andrew Woodward, Concord, MA (US)

(73) Assignee: Warwick Mills, Inc., New Ipswich, NH (US)

( * ) Notice: Subject to any disclaimer, the term of this patent is extended or adjusted under 35 U.S.C. 154(b) by 1156 days.

(21) Appl. No.: 12/261,211

(22) Filed: Oct. 30, 2008

(65) Prior Publication Data

US 2012/0152098 A1 Jun. 21, 2012

Related U.S. Application Data

(60) Provisional application No. 60/983,731, filed on Oct. 30, 2007.

(51) Int. Cl.
*F41H 5/04* (2006.01)
*F41H 1/02* (2006.01)

(52) U.S. Cl.
USPC ............. 89/36.02; 89/36.05; 89/916; 89/922; 428/911

(58) Field of Classification Search
USPC ............. 89/36.02, 36.05; 428/105, 109, 428/34.4, 911; 2/2.5; 264/339
See application file for complete search history.

(56) References Cited

U.S. PATENT DOCUMENTS

| | | | |
|---|---|---|---|
| 1,574,188 A * | 2/1926 | Friedman | 428/102 |
| 1,872,482 A * | 8/1932 | Messing | 264/339 |
| 2,697,054 A * | 12/1954 | Dietz et al. | 428/110 |
| 2,771,384 A | 11/1956 | Collins | |
| 2,942,327 A | 6/1960 | Corry | |
| 3,000,772 A * | 9/1961 | Lunn | 442/208 |
| 3,061,839 A * | 11/1962 | Foster | 2/2.5 |
| 3,130,414 A | 4/1964 | Bailey et al. | |
| 3,509,833 A | 5/1970 | Cook | |
| 3,683,828 A | 8/1972 | Alliegro et al. | |
| 3,826,172 A | 7/1974 | Dawson | |
| 3,945,042 A | 3/1976 | Lobo | |

(Continued)

FOREIGN PATENT DOCUMENTS

EP 0933612 A2 8/1999
EP 0967453 A1 12/1999

(Continued)

OTHER PUBLICATIONS

PCT Search Report dated Jun. 16, 2009 of Patent Application No. PCT/US08/81688 filed Oct. 30, 2008.

(Continued)

*Primary Examiner* — Bret Hayes
(74) *Attorney, Agent, or Firm* — Maine Cernota & Rardin (57) ABSTRACT

A flexible armor system includes a rigid panel of a stiffness calculated to resist penetration by a known ballistic object, made from multiple layers of Ultra High Molecular Weight Poly-Ethylene fibers or other high tenacity fibers, which is then pre-flexed beyond its elastic bending limit to create a distributed pattern of surface buckling, with localized areas of interior delamination, which together function as bending or hinge lines to provide flexibility to the otherwise rigid panel and thereby lower its overall stiffness to less than that calculated for the rigid panel to resist the ballistic object. The areas of delamination have a width of less than one half the diameter of the ballistic object.

16 Claims, 5 Drawing Sheets

VOID-HINGE STRUCTURE IN PANEL FLEXED BEYOND THE ELASTIC LIMIT

(56) References Cited

U.S. PATENT DOCUMENTS

| | | | |
|---|---|---|---|
| 4,090,011 A | | 5/1978 | Barkman et al. |
| 4,198,707 A | | 4/1980 | Haupt et al. |
| 2,640,987 A | | 6/1983 | Ehlers |
| 4,559,251 A | | 12/1985 | Wachi |
| 4,574,105 A | | 3/1986 | Donovan |
| 4,608,717 A | * | 9/1986 | Dunbavand ................ 2/2.5 |
| 4,660,223 A | | 4/1987 | Fritch |
| 4,911,061 A | | 3/1990 | Pivitt et al. |
| 5,102,723 A | | 4/1992 | Pepin |
| 5,175,040 A | | 12/1992 | Harpell et al. |
| 5,185,195 A | | 2/1993 | Harpell et al. |
| 5,191,166 A | | 3/1993 | Smirlock et al. |
| 5,196,252 A | | 3/1993 | Harpell |
| 5,198,280 A | | 3/1993 | Harpell et al. |
| 5,254,383 A | | 10/1993 | Harpell et al. |
| 5,326,249 A | | 7/1994 | Weissfloch |
| 5,361,678 A | | 11/1994 | Roopchand et al. |
| 5,362,527 A | | 11/1994 | Harpell et al. |
| 5,364,679 A | | 11/1994 | Groves |
| 5,443,883 A | * | 8/1995 | Park ................ 428/103 |
| 5,565,264 A | | 10/1996 | Howland |
| 5,591,933 A | | 1/1997 | Li et al. |
| 5,601,895 A | | 2/1997 | Cunningham |
| 5,619,748 A | | 4/1997 | Nelson et al. |
| 5,668,344 A | | 9/1997 | Bornstein |
| 5,677,029 A | | 10/1997 | Prevorsek et al. |
| 5,723,201 A | * | 3/1998 | Czetto, Jr. ................ 428/181 |
| 5,738,925 A | * | 4/1998 | Chaput ................ 428/101 |
| 5,824,940 A | | 10/1998 | Chediak et al. |
| 5,827,608 A | | 10/1998 | Rinehart et al. |
| 5,837,623 A | | 11/1998 | Howland |
| 5,853,547 A | | 12/1998 | Ahrens et al. |
| 5,882,357 A | | 3/1999 | Sun et al. |
| 5,891,379 A | | 4/1999 | Bhattacharyya et al. |
| 5,976,996 A | | 11/1999 | Howland |
| 6,035,438 A | | 3/2000 | Neal et al. |
| 6,077,319 A | | 6/2000 | Sun et al. |
| 6,266,818 B1 | | 7/2001 | Howland et al. |
| 6,332,390 B1 | | 12/2001 | Lyons |
| 6,510,777 B2 | | 1/2003 | Neal |
| 6,534,426 B1 | | 3/2003 | Chiou |
| 6,543,055 B2 | | 4/2003 | Howland et al. |
| 6,548,430 B1 | | 4/2003 | Howland |
| 6,612,217 B1 | | 9/2003 | Shockey et al. |
| 6,627,562 B1 | | 9/2003 | Gehring, Jr. |
| 6,668,868 B2 | | 12/2003 | Howland et al. |
| 6,693,052 B2 | | 2/2004 | Howland |
| 6,720,277 B1 | | 4/2004 | Howland |
| 6,743,498 B2 | | 6/2004 | Fourmeux |
| 6,770,287 B1 | | 8/2004 | Sun et al. |
| 6,834,685 B2 | | 12/2004 | Hannigan et al. |
| 6,840,288 B2 | | 1/2005 | Zhu et al. |
| 6,911,247 B2 | | 6/2005 | Howland |
| 6,998,165 B2 | | 2/2006 | Howland |
| 7,007,308 B1 | | 3/2006 | Howland et al. |
| 7,115,315 B2 | | 10/2006 | Fowler |
| 7,192,498 B2 | | 3/2007 | Howland |
| 7,393,588 B1 | | 7/2008 | Howland |
| 7,601,416 B2 | * | 10/2009 | Palley ................ 428/171 |
| 2001/0053645 A1 | | 12/2001 | Henderson |
| 2002/0069444 A1 | | 6/2002 | Graham et al. |
| 2002/0106956 A1 | | 8/2002 | Howland |
| 2002/0111099 A1 | | 8/2002 | Howland |
| 2002/0122927 A1 | | 9/2002 | Howland |
| 2002/0124904 A1 | | 9/2002 | Howland et al. |
| 2003/0159575 A1 | | 8/2003 | Reichman |
| 2003/0228815 A1 | | 12/2003 | Bhatnagar et al. |
| 2004/0092183 A1 | | 5/2004 | Geva et al. |
| 2005/0118716 A1 | | 6/2005 | Howland et al. |
| 2005/0197024 A1 | | 9/2005 | Howland |
| 2005/0255776 A1 | | 11/2005 | Howland |
| 2005/0288797 A1 | | 12/2005 | Howland |
| 2006/0005305 A1 | | 1/2006 | Haskell |
| 2006/0014457 A1 | | 1/2006 | Newton et al. |
| 2006/0068158 A1 | | 3/2006 | Howland |
| 2007/0016996 A1 | | 1/2007 | Seitzinger et al. |
| 2007/0054817 A1 | | 3/2007 | Li et al. |
| 2007/0099526 A1 | | 5/2007 | Heerden et al. |
| 2007/0238379 A1 | | 10/2007 | Bhatnagar et al. |
| 2008/0032084 A1 | | 2/2008 | Biermann et al. |
| 2008/0087161 A1 | | 4/2008 | Dean et al. |
| 2008/0104735 A1 | | 5/2008 | Howland |
| 2008/0119099 A1 | * | 5/2008 | Palley ................ 442/134 |
| 2008/0160855 A1 | | 7/2008 | Howland |
| 2008/0241443 A1 | * | 10/2008 | Liu et al. ................ 428/34.1 |
| 2008/0307553 A1 | * | 12/2008 | Jbeili et al. ................ 2/2.5 |
| 2009/0255022 A1 | | 10/2009 | Smith |
| 2009/0293711 A1 | | 12/2009 | Altergott et al. |
| 2010/0319844 A1 | * | 12/2010 | Hirschberg et al. ......... 156/245 |
| 2012/0152098 A1 | | 6/2012 | Howland et al. |
| 2012/0159680 A1 | | 6/2012 | Howland |

FOREIGN PATENT DOCUMENTS

| | | |
|---|---|---|
| GB | 2004177 A | 3/1979 |
| KR | 1020100004357 A | 1/2010 |
| WO | 9220520 A1 | 11/1992 |
| WO | 0033013 | 6/2000 |
| WO | 0210667 A2 | 2/2002 |
| WO | 03057462 A1 | 7/2003 |
| WO | 2005/044559 A1 | 5/2005 |
| WO | 2005044559 | 5/2005 |
| WO | 2008048301 A2 | 4/2008 |

OTHER PUBLICATIONS

Anderson, Charles E. Jr., et al., "On the Hydrodynamic Approximation for Long-Rod Penetration", International Journal of Impact Engineering, 1999, pp. 23-43, vol. 22.

Anderson, Charles E., An Examination of Long-Rod Penetration, Int. J. Impact Engng vol. 11, No. 4, 1991, pp. 481-501.

Anderson, Charles F, Long-Rod Penetration, Target Resistance, and Hypervelocity Impact, Int. J. Impact Engng vol. 14, No. 1-4, 1993, pp. 1-12.

European Examination Report for EP Application No. 01994286.1, dated Oct. 1, 2007, 7 pgs.

European Examination Report for EP Application No. 01994286.1, dated May 15, 2009, 3 pgs.

European Examination Report for EP Application No. 01994286.1, dated Aug. 16, 2010, 4 pgs.

European Examination Report for EP Application No. 04796627.0, Jul. 13, 2010, 8 pgs.

European Examination Report for EP Application No. 04796627.0, Mar. 28, 2011, 7 pgs.

European Search Report for EP Application No. 05724858, Mar. 25, 2010.

European Supplementary Partial Search Report for EP Application No. 01994286, dated Jan. 10, 2005, 4 pgs.

Kleponis, David S., et al., Material Design Paradigms for Optimal Functional Gradient Armors, Mar. 13, 2000, 6 pages.

PCT International Search Report dated Jun. 28, 2002 of International Appl. No. PCT/US01/48947 filed Dec. 13, 2001.

PCT Search Report dated Aug. 22, 2008 of Patent Application No. PCT/US07/67878 filed May 1, 2007.

PCT Search Report for App. No. PCT/US04/35784, dated Mar. 7, 2005.

PCT Search Report for PCT Application No. PCT/US2005/07402, Aug. 7, 2006, 1 page.

Walker, James, A Time-Dependent Model for Long-Rod Penetration, Int. J. Impact Engng vol. 16, No. 1, pp. 19-48, 1995.

European Search Report for EP Application No. 04796627.0, Mar. 15, 2010, 4 pages.

PCT Search Report and Written Opinion for PCT Application No. PCT/US2011/031656, Feb. 8, 2012, 14 pages.

European Search Report for EP Application No. 07868256.4, Oct. 24, 2012, 6 pgs.

European Search Report for EP Application No. 08870614, Nov. 19, 2012, 6 pgs.

\* cited by examiner

FIG. 1

UN-FLEXED PANEL CROSS SECTION SHOWING 12 LAYERS OF FIBER 6 IN EACH OF 2 DIRECTIONS

FIG. 2A

VOID-HINGE STRUCTURE IN PANEL FLEXED BEYOND THE ELASTIC LIMIT

SOFT PLATE SOFT PANEL BONDED MULTI LAYER ARMOR MATERIALS

RELATED APPLICATIONS

This application claims priority to pending U.S. Provisional Application Ser. No. 60/983,731, filed Oct. 30, 2007

BACKGROUND OF THE INVENTION

Ultra High Molecular Weight Poly-Ethylene (UHMWPE) is commonly used in armor applications. Its high strength combined with its elongation properties makes it an ideal material for stopping ballistic threats. Currently there are two common forms of the material which are used in armor applications. "Soft" applications where plies of UHMWPE are layered in conjunction with one another to preserve flexibility, and "hard" applications where the layers of UHMWPE are heated and pressed together to bond the material into a solid.

"Soft" applications are most common in the body armor industry, where flexibility is required in order to preserve comfort. The downside is that the same amount of UHMWPE when bonded together will yield much higher performance (i.e. will stop ballistic threats with much more energy).

The material in its "hard" form is most commonly found in vehicle and installed armor applications. These applications do not require flexibility, so they are able to achieve better performance and lower weight using less material when bonded into a rigid panel. There are some combined applications of soft and hard ballistics for body armor. In this approach the larger area of the body is covered by an un-bonded material. In addition to this "soft material" a hard plate is used over the central portion of the body however the size and coverage of this high performance panel is restricted because of low flexibility. The goal of improved armor material is to have the improved performance of the fully bonded hard panel with the flexibility of the single layers.

UHMWPE fibers are described above because at the current time this fiber has the best tenacity, 24-35 grams per denier, depending on how the fiber is measured. However, there is much work being done to discover or develop even better fibers for the armor applications described above. For example, Arimid fibers are easy to laminate, and PBO (poly p-phenylene-2,6-bezobisoxazole or ZYLON®) and M5®, fibers may yet find greater application in this area.

SUMMARY OF THE INVENTION

Figure 1:
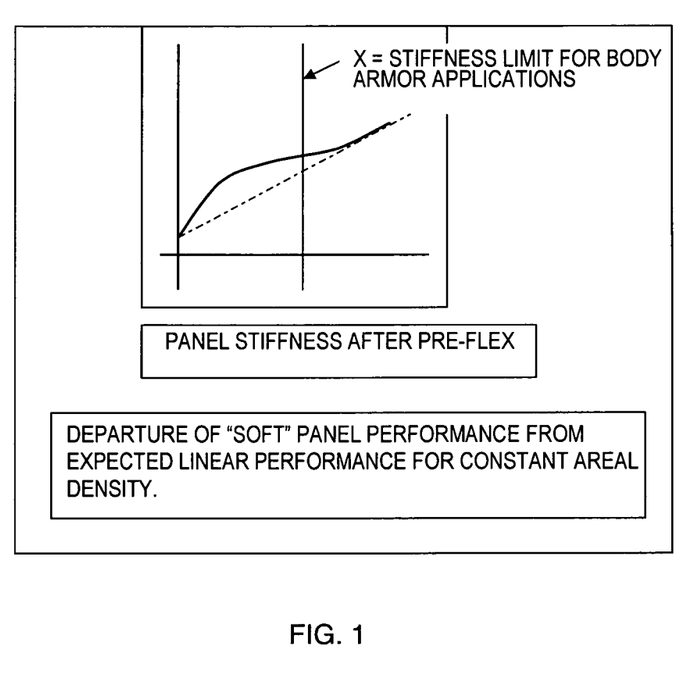
FIG. 1 is a graphical representation of Ballistic Performance versus Panel Stiffness performance after the panel has been subjected to Pre-Flexure in accordance with the invention.

It was previously believed that the shear stiffness of UHMWPE was directly correlated with ballistic performance (i.e. as shear stiffness increases, performance increases). However, it has been discovered that by building or creating flex points in a molded panel, ballistic performance can be unexpectedly and significantly increased without significant sacrifices to flexibility, or to put it conversely, flexibility can be unexpectedly and significantly increased without significant sacrifice to ballistic performance. As FIG. 1 shows, the correlation between performance and shear stiffness is now represented by a curve, rather that a straight line as is normally expected. While the discussion will refer to UHMWPE throughout, it will be appreciated that the technology will apply to any fiber of similar characteristics to those discussed and assumed with respect to UHMWPE.

In practice there is a range of stiffness that is acceptable for body armor. We describe this stiffness range as a function of three point bending performance. This bending force resultant for articles of the invention is a non-linear function of thickness and is in agreement with thin plate theory until the onset of buckling. This effective stiffness in use is, however, the stiffness that is measured after plastic buckling has occurred. In a laminate, this buckling takes the form of inter-ply bond void formation. The buckle-voids create hinge points or hinge line segments in the material that flex more readily than the unbroken plate sections, and relieve the bending stress on the plate. Bending stiffness of a panel of the invention may be characterized as:

$$\text{Bending stiffness} = (\text{Thickness}^3 * \text{material constant}) / (\text{hinge factor} * \text{hinge spacing})$$

The effective shear or bending stiffness of a ballistic panel of the invention is a combination of the thin plate model modified with a correction for the spacing of the hinge points. The correction factor can be loosely characterized or thought of as the bending performance of the ½ thickness of the un-buckled panel, because the buckle void is typically formed at the neutral fiber of the plate, nominally the center layer assuming the plate is of uniform construction in plane and depth.

Surface buckling and the accompanying interior voids occurring in the panel under bending stress tends to form as hinge line segments oriented in a threadline direction of the threads or strands of an interior sheet, layer or ply. These hinge points reduce the effective stiffness of the plate as a whole but do not affect the ballistic or singular point of impact performance in a linear way as long as the width of the hinge lines is proportionally small as compared to the diameter of the ballistic object or bullet of interest. However, as a result of this relationship, the hinge-like buckle void limits the maximum practical thickness of the basic system. As the thickness of the plate or laminate structure goes up, the hinge-buckle zone width increases in proportion to the thickness, in order to permit flexure. As the in-plane cross section dimension of the hinge-buckle zone approaches the bullet diameter, the performance of the panel approaches the performance of the separate laminate layers rather than the solid plate. For this reason, there may be further utility in a layered arrangement of such panels.

Other aspects of the invention will be apparent from the figures and the further description and claims that follow.

DETAILED DESCRIPTION OF THE INVENTION

Figure 2A:
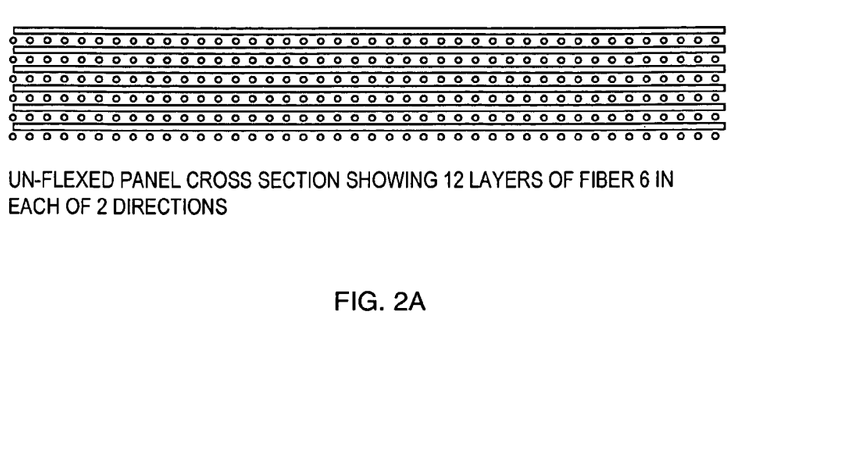
FIG. 2A is a diagrammatic cross section view of a bonded panel or plate section showing 12 bonded layers of fiber; six layers on one direction interspersed with six layers in another direction, the directions being nominally at right angles to each other.

The invention is susceptible of many embodiments, including methods and structures. Referring to FIG. 2A, there is illustrated a diagrammatic cross section view of a first embodiment bonded panel or plate section showing 12 bonded layers of fiber, with six layers oriented with thread lines running in one direction, and interspersed with the other six layers which are oriented with their threadlines running in another direction, the directions being nominally at right angles to each other. Other configurations may have woven or unwoven sheets of fibers with threadlines of respective layers oriented at other than right angles, such as at uniform 60 or 45 degrees or more or less apart, or with non-uniform angular orientations. While the discussion may often refer to UHMWPE fibers, it will be appreciated that the term is used for its ready association with fibers of this general characteristic and high tenacity and that the technology claimed is applicable to any fiber type of similar high tenacity and ability to be configured and bonded together as a relatively rigid, multi-layered composite structure. For purposes of the claims, the term "high tenacity" with respect to fibers means fibers of the same or higher tenacity range as UHMWPE fibers.

Figure 2B:
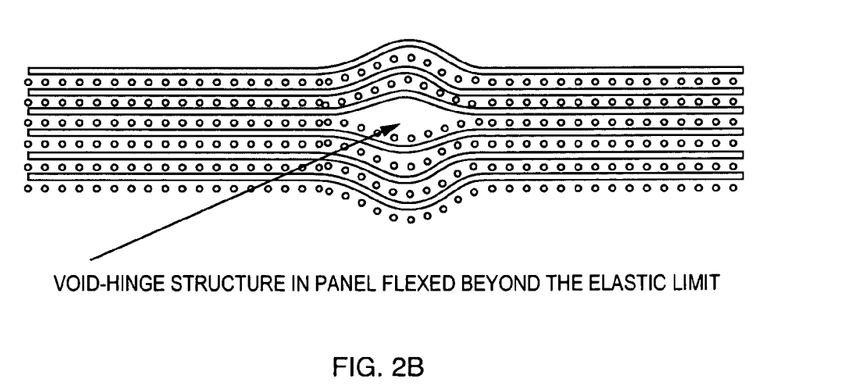
FIG. 2B is a diagrammatic cross section view of the panel of FIG. 2A, here exhibiting in cross section a void-hinge structure in the panel, created by Pre-Flexure, the flexing of the panel beyond its elastic limit.

Referring now to FIG. 2B, there is illustrated a diagrammatic cross section view of the panel of FIG. 2A, here exhibiting in cross section a soft void or void-hinge structure in the panel, created in accordance with one embodiment of the invention, here referred to as pre-flexure. Pre-flexure involves flexing of the panel beyond its elastic limit, preferably in one direction at a time, and reflexing of the panel in the other direction to a state where the bulge of the fracture line is readily apparent on both faces of the panel and a void or multiple voids are introduced within the fracture zone indicating failure of the interlayer adhesion. It will be readily apparent that the density of the void hinge will be less than that of the pressed plate from which it was created.

Pre-flexure or bending the panel in a first direction, upon reaching the elastic limit or fracture point of the structure, results in a detectable bulge on the inside face of the flexed panel at the fracture line, indicating compressive deformation of the layers on that side, and the rending or failure of interlayer adhesion in that region. Re-flexing of the panel back to its planar state or its elastic limit in the other direction produces the corresponding bulge in what was originally the tension side of the bend line, and opens the voids as illustrated in the cross section view FIG. 2B.

In structures or panels constructed with UHMWPE or similar fibers in all layers having the same or nearly the same directional orientation, stress applied normal to the common thread line orientation will result in total failure of the panel at the stress point, rather than surface buckling and interior layer delamination, with separation of all layers along a common thread line due to the low tolerance in the cross direction for interply shear stress. This characteristic of directionally varying resistance to interply shear stress, can be tuned by altering the orientation of the respective layers of fibers at panel formation. Surface buckling and interior delamination induced by pre-flexing may vary in degree depending on the axis of flexure. The location and nature of the interior delamination or shearing of the interply bond between the fiber layers of the panel will also be affected, according to the number and orientation of fiber layers. The ability to directionally tune the overall panel performance in this respect by varying the directional orientation of specific layers during panel formation, in combination with a coordinated pattern of subsequent pre-flexing, may be useful in some applications.

In the same or other embodiments, fiber size may be varied between layers, in combination or independent of selected thread direction orientations of respective layers, along with a coordinated pattern of subsequent pre-flexing, so as to provide further potential to alter initial panel stiffness, surface buckling, interior delamination, and final panel characteristics.

In such embodiments and applications, a suitably constructed rigid panel with intentionally selected non-uniform fiber sizes and thread line orientations, to which is applied a coordinated pattern of pre-flexing, offers potential for useful variations in the finished panel such as but not exclusive to surface buckling being more evident on one surface than the other or in one direction than another, interior delamination being altered from that expected of a homogenous and uniform panel construction panel so as to affect or improve resistance to penetration of a ballistic object, panel bending or flexibility having a greater range towards one side than the other or being greater in one or some in-plane directions than in others so as to enable, and so on.

Figure 3:
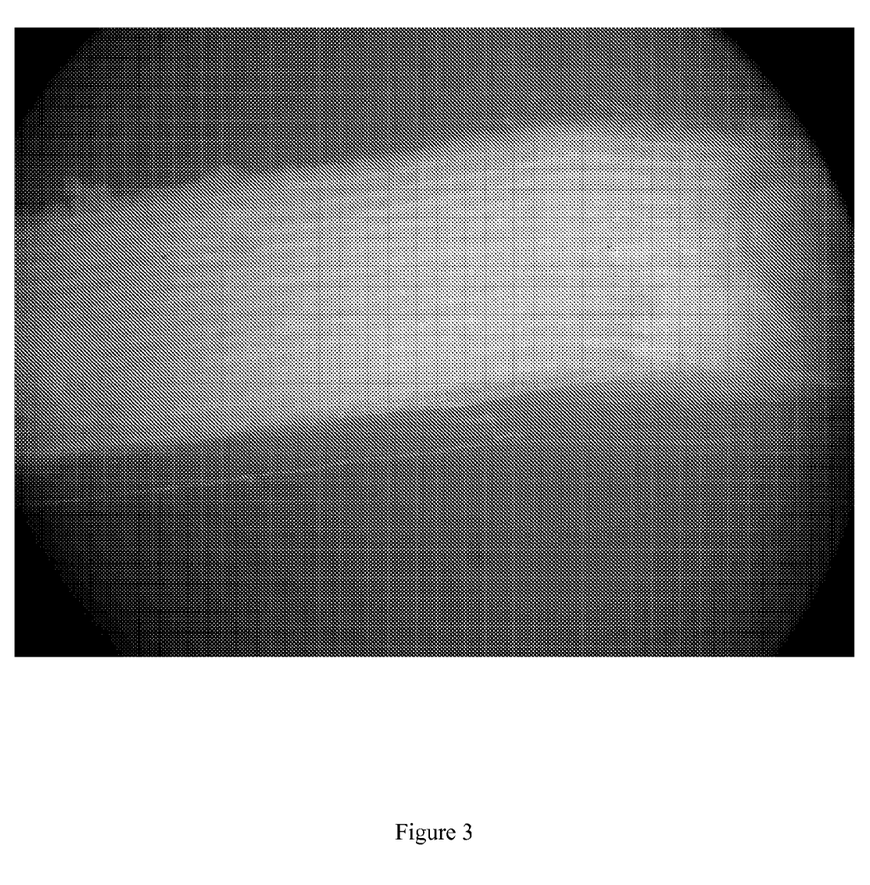
FIG. 3 is a micrograph cross section view of a molded UHMWPE panel fabricated of multiple layers, illustrated before the introduction of a bending stress-induced void-hinge point in accordance with the invention.

Referring to FIG. 3, a micrograph provides a cross section view of a molded UHMWPE panel fabricated of multiple layers, illustrated before the introduction of a bending stress-induced void-hinge point in accordance with the invention.

Figure 4:
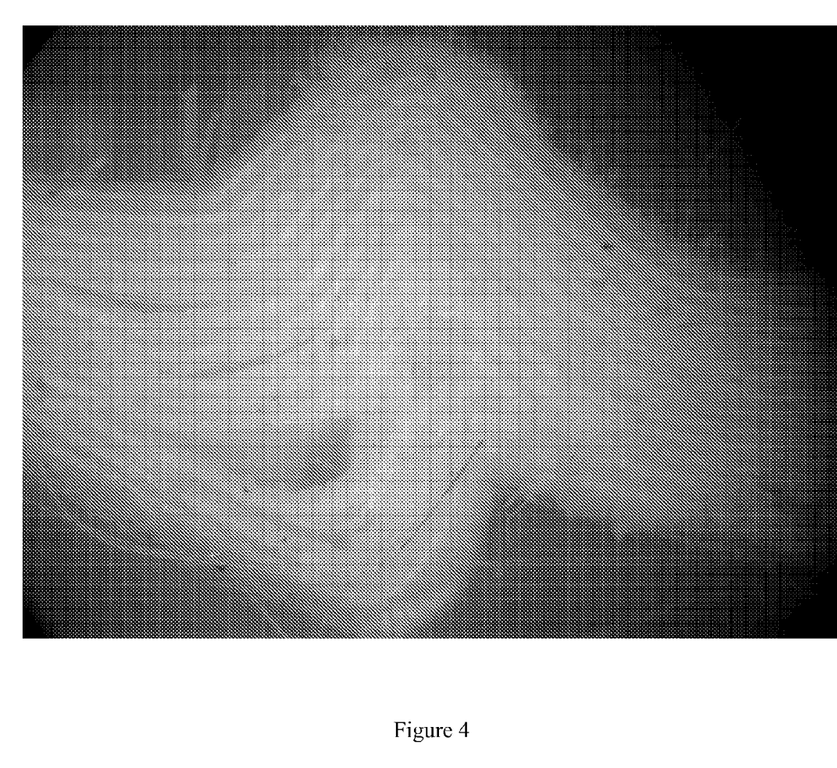
FIG. 4 is a micrograph cross section view of a molded UHMWPE panel fabricated of multiple layers, illustrated after the introduction of a bending stress-induced void-hinge point, where hinge point bulges are evident on both sides of the panel from bending stress applied first in one direction and then the other.

Referring now to the micrograph of FIG. 4, there is revealed in cross section a void hinge in a panel of bonded UHMWPE fibrous layers, clearly distinctive when compared to the panel of FIG. 3. This panel was subjected to a bending stress or "pre-flexing" conditioning process so as to buckle, rupture or fracture the panel at occurring locations defined by the flex clamp process, resulting in this void-hinge point. Hinge point bulges are evident on both the top side and underside of the panel from bending stress applied first in one direction and then the other.

The delaminating or shearing of the inter-layer bond between two adjacent interior fibrous layers is clearly evident. The two way, pre-flexing of the bonded panel according to the invention to in excess of its bending limit, first one way then the other, resulted at this break point in the formation of the surface buckles and interior voids which now enable a degree of panel flexure useful for body armor applications, without reducing the panel's ballistic protection for specific size projectiles. For example, at least three voids are evident in this figure. Each is about 1 millimeter in length, much less than the diameter of a 9 mm bullet.

Various methods may be employed to generate a relatively uniformly spaced distribution of the void-hinge segments in a laminated plate of this type, although in some embodiments, the distribution may be intentionally non-uniform such as where specific areas of the plate surface are not required to have the same degree of flexure. One way to create the void hinges is to put the plate through a set of rollers or deflectors configured to repetitively exceed and recede from the bending limit of the plate as it is being run or drawn through the roller or deflector assembly or mechanism. Other and various means, such as but not limited to a panel clamp and associated deflection of the panel outboard of the clamp may be employed for pre-flexing panels to achieve a desired orientation and distribution of hinge line segments.

The plate may be subjected multiple times to a pre-flexing operation, or to multiple pre-flexing mechanisms, with the same or with alternate orientations with respect to threadlines in the plies or layers of the panel, whereby void hinges are appropriately placed and spaced for the desired degree of flexure. The rotational angle of orientation of the panel for pre-flexing may be such that one or more of the threadlines of the interior fibrous layers of the panel is normal or at cross machine orientation to the machine direction of travel of the panel through the pre-flexing mechanism such that the threadline is parallel to the nip or bend line as it enters.

Figure 5:
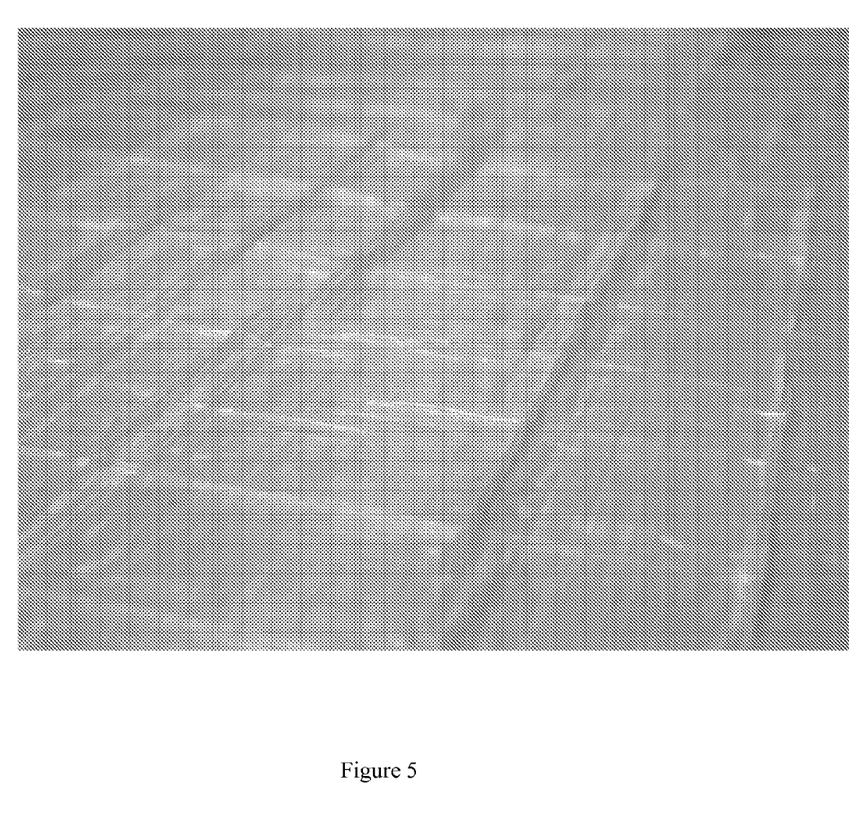
FIG. 5 is a photographic perspective view of one surface of a panel of the invention revealing a grid-like pattern of uniformly spaced, parallel hinge line segments.

FIG. 5 is a photographic perspective view of one surface of a panel of the invention revealing a grid-like pattern of relatively uniformly spaced, parallel hinge line buckles indicating the presence of interlayer voids that together provide flexure to the otherwise rigid panel.

In one example of the invention, there is provided a panel intended to address NIJ (National Institute of Justice) requirements of level 3a ballistic performance. UHMWPE fiber sheets that are not woven but where cross-plied laid yarns are used, without additional films on the surface. Dynema material of the types HB2-HB51 or HB50 all have similar results. The layer count for the full assemblage is 7-12 layers of HB2 bonded plate, pre-flexed according to the invention, 11-16 layers of unbonded fiber, and 3-8 layers of HB2 bonded and pre-flexed plate in the back side of the panel. In addition for this example, the surface of the fiber has a combined surface energy of greater than 35 dynes.

The typical pressing temperature limit for UHMWPE fiber is 257 degrees Fahrenheit, and the panel pressing temperature approaches this value. However, the control of the bonding process is primarily the result of controlling bonding pressure. The optimization of flex and ballistic performance for this and similar embodiments was found to be a "soft" press for bonding for panel formation, of greater than about 200 psi but not more than 1000 psi. The time required is established by the heating cycle of the materials. After bonding, the panel is pre-flexed in a controlled bending process in accordance with the invention. The panel is preferably but not necessarily flexed such that a regular spacing of the buckling-hinge points is created. The spacing of the hinge-buckle points in this and some other examples is 20-50 mm. Relatively closer spacing provides a relatively greater effective radius of panel flexure.

Testing of the panel described in the above example yielded a 9 mm V50 (ballistic performance test result) of 2000 fps and a backside signature with the 44 cal. mag. of 33 mm. The panel has an areal density of 1.0 lbs or less.

A panel constructed to the specifications exhibits most of the performance of a continuous fully bonded plate of UHMWPE, however a panel configured in accordance with this invention is able to accept formation of specific bend points at the buckling void zones. These hinge points allow for flexibility across the panel. These void-hinge zones contain a linear region within the panel where there is a delamination or void in the bonded area. By controlling the size of this void, based on the diameter of the projectile to be stopped, the panel will perform consistently across its entire area of protection.

A panel, or assemblage of such panels, produced according to these specifications maintains a stiffness of less than limiting flexed stiffness of a conventional panel, thus making it suitable for soft armor applications. The limiting bending stiffness is the value at which a material is deemed too stiff to be sufficiently flexible for body armor applications.

Another example of the invention is an armor panel designed to stop a ballistic object or bullet "B", where the panel is make of Ultra High Molecular Weight Poly-Ethylene fiber layers press bonded and pre-flexed such that bending stiffness is less than "X" and in-plane, cross section, void size at bend points is less than one half the ballistic object or bullet "B" diameter. In some examples the void size is roughly equal to one sixth the bullet diameter.

Yet another example is a panel of UHMWPE more than 0.5 mm of fiber thickness with a buckling-void size less than 3 mm when flexed beyond the elastic limit.

Still another example is a panel of UHMWPE of at least 10 fibrous layers such that the bonded fiber thickness is one third to one sixth the apparent width (length, in cross section views) of the buckling zone when flexed beyond the elastic limit.

An additional example of the invention is a pressed panel of at least 10 fibrous layers of UHMWPE that have no crossing points or interweaving of layers, where the fiber layers are oriented in at least 2 directions and with the fibers and layers bonded such that in bending, the buckling mode of the invention creates at each break point a localized single or multiple interior void or delamination, which is a shearing of the bond between two adjacent interior layers, within the bonded stack of fibrous layers.

Still yet another embodiment of the invention is a method for making a flexible armor system comprising the steps: Forming a panel of stiffness "X" from fibrous layers of Ultra High Molecular Weight Poly-Ethylene, where a flexible armor system of one or more layers of panels of stiffness "X" are calculated to be sufficient to stop a bullet "B" which the armor system is intended to stop. Then pre-flexing the panel beyond its bending limit so as to introduce a distributed pattern of surface buckling and localized delaminating of interior layers of the panel proximate the surface buckles, where the areas of delamination have a width of less than one half the diameter of the bullet "B" which the armor system is intended to stop. Then assembling the one or more layers panels as the armor system.

The invention is susceptible of other and numerous embodiments, examples and equivalents. For example, there is within the scope of the invention a flexible armor panel for resisting penetration by a ballistic object, having multiple layers of UHMWPE or other type fibers of similarly high or higher tenacity bonded together under elevated pressure and temperature, and configured with a distributed pattern of bending lines consisting of visible, raised, surface buckling on both sides of the panel, with localized areas of delamination of interior layers near the surface buckles, that would be of a visible width if examined in cross section. A ballistic object is generally one of relatively high velocity and low mass as compared to a knife thrust or rifle butt thrust, such as a bullet or shell fragment or other piece of material accelerated by a propellant and intended to penetrate a soft target, causing damage. A specific "ballistic object" for purposes of the claims refers to a defined set of characteristics that includes mass, diameter, and velocity.

The localized areas of interior delamination may have a width of up to about panel thickness or a little more, but less than twice panel thickness. The surface buckling may have a width of about panel thickness or so but not more than about twice panel thickness. Adjacent parallel bending lines will in most cases be spaced (center to center) at least five times panel thickness so as to isolate areas of delamination. The localized areas of delamination may have a width of less than one half the diameter of a ballistic object or bullet which the panel is intended to resist.

The fibers within each layer may have a common thread line direction, in other words be laid parallel. Adjacent layers may have different thread line directions, varying from a few degrees up to 90 degrees, or right angles as in machine and cross machine directions. The distributed pattern of bend lines may include at least two intersecting sets of parallel bending lines, forming a grid as is evident in FIG. 5.

Another example of the invention includes a flexible armor panel made of multiple layers of UHMWPE or other type fibers of at least similarly high tenacity bonded together under elevated pressure and temperature as a rigid panel where the fibers in each layer have a common thread line direction and adjacent layers have different thread line directions, where the rigid panel is then configured by pre-flexing with a distributed pattern of bending lines consisting of visible, raised surface buckling on both sides of the panel with localized areas of interior layer delamination beneath the surface buckles. The surface buckling may have a width in cross section of approximately about panel thickness up to about twice panel thickness. Parallel bending lines may be separated by at least three times panel thickness for greater segregation of the areas of delamination, although closer spacing is within the scope of the invention.

The areas of delamination may have a width of up to about panel thickness but not as much as twice panel thickness. In the same or other embodiments, the width may be less than one half the diameter of a ballistic object which the panel is intended to resist, for the reasons described above. Also, the flexible armor panel may have an effective bending stiffness, taking into account the pattern of bending lines and the flexibility they introduce, of somewhat less than normally required of a rigid panel of the same fiber type to stop a specified ballistic object.

In yet another example, a flexible armor panel of the invention may use fibers of UHMWPE or similarly high or higher tenacity, of greater than 0.5 mm diameter, and have localized areas of delamination less than 3 mm wide. The number of layers of fibers in some embodiments may be at least ten.

In still yet another example, there is a method for making a flexible armor system including the steps: forming a rigid panel from fibrous layers of Ultra High Molecular Weight Poly-Ethylene or material of similar performance characteristics, where the panel is of sufficient bending stiffness to stop a selected ballistic object; then flexing the panel beyond its elastic bending limit in selected locations so as to create a distributed pattern of bending lines apparent on both sides of the panel, consisting of lines of surface buckling with localized channels or veins of delamination voids within interior layers of the panel, running along beneath the lines of surface buckling. The areas of delamination may have a width of half or less the diameter of the selected ballistic object in order to resist penetration of a strike directly on a bend line.

In making a flexible armor panel of the invention, a rigid panel of multiple layers of UHMWPE or similar fibers may be formed using elevated temperature, and forming pressure between about 200 and 1000 psi. Later formed bending lines generated by pre-flexing the rigid panel along selected bending lines to just beyond its elastic limit may be spaced apart somewhat to separate the surface buckling and areas of delamination of interior layers by a distance of three times or more of panel thickness. There may be a distributed pattern of bending lines with at least two intersecting sets of parallel bending lines of equal or unequal spacing between parallel lines. The surface buckling may be about a panel thickness wide, more or less, but not wider than about twice panel thickness.

As still yet another example, a flexible armor panel of the invention may be formed or pre-flexed, in part, by drawing a rigid, multi-layered UHMWPE or similar type fiber panel through a mechanism configured to repetitively apply bending stress to the panel, alternately exceeding and receding from an elastic bending limit of the panel as it passes through, to achieve the desired pattern of bending lines.

Other and numerous examples, embodiments and variations of the invention will be readily apparent to those skilled in the art from the description, figures and claims herein.

We claim:

1. A flexible armor panel for resisting penetration by a ballistic object, comprising:
   at least three layers of high tenacity fibers, said layers being in fully overlapping contact with one another, said layers being bonded together over substantially their entire contacting surfaces, said bonding being performed at a pressure and temperature that are elevated above ambient; and
   a distributed pattern of bending lines formed in the bonded layers, said bending lines comprising surface buckling and localized areas of delamination of said layers from each other proximate the surface buckling, said localized areas of delamination being areas of partial delamination of the layers, whereby some adjacent layers in the localized areas are delaminated from each other while other adjacent layers in the localized areas remain bonded together.

2. The flexible armor panel of claim 1, said localized areas of delamination having a width of less than twice panel thickness.

3. The flexible armor panel of claim 1, said surface buckling having a width of less than twice panel thickness.

4. The flexible armor panel of claim 1, adjacent parallel said bending lines being separated by a distance of at least three times panel thickness.

5. The flexible armor panel of claim 1, said localized areas of delamination having a width of less than one half the diameter of a ballistic object which the panel is intended to resist.

6. The flexible armor panel of claim 1, the fibers within each layer having a common thread line direction, adjacent said layers having different thread line directions.

7. The flexible armor panel of claim 1, the fibers of each layer having a common thread line direction, adjacent said layers having thread line directions at right angles to each other.

8. The flexible armor panel of claim 1, the distributed pattern of bending lines comprising at least two intersecting sets of parallel bending lines.

9. A method for making a flexible armor system comprising the steps:
   forming a rigid panel comprising layers of high tenacity fibers, whereby the panel has sufficient bending stiffness to stop a selected ballistic object;
   flexing the rigid panel beyond its elastic bending limit in selected locations so as to create a distributed pattern of bending lines comprising surface buckling and localized delamination of interior layers of the panel proximate the surface buckling, whereby said areas of delamination have a width of less than one half the diameter of the selected ballistic object.

10. The method of claim 9, said forming a rigid panel comprising using elevated temperature and pressure between about 200 and 1000 psi.

11. The method of claim 9, wherein parallel said bending lines are spaced apart a distance at least three times greater than panel thickness.

12. The method of claim 9, said flexing the rigid panel being conducted whereby said distributed pattern of bending lines comprises at least two intersecting sets of parallel bending lines.

13. The method of claim 9, said flexing the rigid panel being conducted whereby said surface buckling is not wider than about twice panel thickness.

14. The method of claim 9, said multiple layers comprising at least ten layers, said delamination having a width of less than panel thickness.

15. The method of claim 9, said flexing the rigid panel comprising drawing said panel through a mechanism configured to repetitively apply bending stress to the panel, alternately exceeding and receding from an elastic bending limit of the panel as it passes there through.

16. The method of claim 9, further comprising:
    assembling multiple said panels into a personal body armor garment.

\* \* \* \* \*